United States Patent
Jeoung

(10) Patent No.: US 6,226,520 B1
(45) Date of Patent: May 1, 2001

(54) CALL SET-UP METHOD IN RADIO COMMUNICATION SYSTEM

(75) Inventor: Jin-Gyu Jeoung, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 08/966,508

(22) Filed: Nov. 10, 1997

(30) Foreign Application Priority Data

Feb. 25, 1997 (KR) .................................................. 97-5667

(51) Int. Cl.⁷ ........................................................ H04Q 7/20
(52) U.S. Cl. .............................. 455/452; 455/464; 455/62
(58) Field of Search ........................... 455/464, 450–455, 455/31.3, 32.1, 59, 62, 63, 166.1–166.2, 509, 135, 445; 379/341, 431, 59

(56) References Cited

U.S. PATENT DOCUMENTS

| | | | |
|---|---|---|---|
| 5,239,676 | * | 8/1993 | Strawczynskie et al. ........... 455/33.2 |
| 5,276,908 | * | 1/1994 | Koohgoli et al. .................... 455/34.1 |
| 5,345,597 | * | 9/1994 | Strawczynskie et al. .......... 455/34.1 |
| 5,437,056 | * | 7/1995 | Rautiola .............................. 455/34.1 |
| 5,497,505 | * | 3/1996 | Koohgoli et al. .................... 455/34.1 |
| 5,649,303 | * | 7/1997 | Hess et al. ............................... 455/63 |
| 5,885,003 | * | 12/1998 | Landden et al. ...................... 704/270 |
| 5,913,167 | * | 6/1999 | Bonta et al. ........................... 455/436 |
| 5,926,755 | * | 7/1999 | Ghisler ................................... 455/414 |

FOREIGN PATENT DOCUMENTS

| | | | |
|---|---|---|---|
| 2193064 | 1/1988 | (GB) . | |
| WO 90/09073 | 8/1990 | (WO) . | |
| WO 95/05735 | 3/1995 | (WO) | .............................. A01K/1/06 |

* cited by examiner

Primary Examiner—Daniel Hunter
Assistant Examiner—C. Chow
(74) Attorney, Agent, or Firm—Dilworth & Barrese, LLP

(57) ABSTRACT

Call processing method for exchanging channel information between a radio terminal and a base station by using a traffic channel. The radio terminal generates a list of radio terminal traffic channels having interference below a predetermined level. A first traffic channel is selected from the generated list having least interference and a call request is transmitted to the base station on the first selected traffic channel. The base station generates a list of base station traffic channels having interference below a predetermined level. A determination is made whether the transmitted call request has been received by the base station. A check of whether the first selected traffic channel is included in the list generated by the base station is made and a call request response signal is transmitted to the radio terminal when said first selected traffic channel is included in the list generated by the base station. A check is made of whether the call request response message is received by the radio terminal on the first selected traffic channel and the call connection proceeds when the call request response message is received by the radio terminal.

9 Claims, 8 Drawing Sheets

CALL SET-UP METHOD IN RADIO COMMUNICATION SYSTEM

BACKGROUND OF THE INVENTION

1. Field of the Invention

The present invention relates to radio communication systems and, more specifically, to a method for setting up a stable call in a radio communication system using dynamic channel allocation.

2. Description of the Related Art

Conventionally, as depicted in FIG. 3A, upon cell set-up between a radio terminal and a radio communication system, a base station performs the call set-up while checking whether or not a call request exists from a subscriber terminal. Initially, the base station checks all available traffic channels under service for a traffic channel having more than a predetermined RSSI (received signal strength indicator) level. In the radio communication system having the above dynamic channel allocation, the traffic channel is dynamically allocated in the base station and the subscriber terminal when an outgoing call request from the subscriber radio terminals 100a, 100b, and 100c is made, as shown in FIG. 1. Namely, when the radio subscriber requests the outgoing call at his position through the radio terminal 100a, the radio terminal 100a selects the channel having little interference and transmits the call request message to the base station 110a. The call set-up in the radio communication system is achieved by exchanging the channel information of the base station and the subscriber radio terminal by using only the corresponding traffic channel between the base station and the subscriber radio terminal in determining the radio traffic channel used by the new call set-up. Therefore, since the radio communication system using the fixed channel allocation re-uses the radio channels, it is understood that the limited radio channels provide service to a large amount of traffic. However, the allocations of channels requires careful engineering analyses of radio propagation conditions and traffic patterns within and between the cells. Fixed allocation cellular radio systems are engineered so that harmful levels of interference from signals used in neighboring cells are unlikely to be encountered.

Micro-cellular radio systems tend to use dynamic, rather than fixed, channel allocation. With dynamic channel allocation (DCA), each cell can potentially use any traffic channel for a given call of those allocated to the entire service. The decision as to which channel to use is made dynamically, i.e., based on channel usage conditions experienced at the time of call set-up. The decision is also made in a decentralized manner, i.e., by the base station or subscriber terminal in question, without any centralized coordination with other cells. This has an advantage in that no detailed engineering analyses are required for each cell site, cell sites can be easily added or moved, and more traffic can be handled than with fixed allocation because unused channels in neighboring cells can be borrowed.

In present systems incorporating DCA, the determination as to which channel is to be used for a call set-up is made according to channel information from either the base station or the subscriber terminal. The disadvantage with this approach is that appreciable interference may be present on that channel from the viewpoint of the other end of the link. For example, a traffic channel may have little appreciable interference, as monitored by the base station. However, the same traffic channel may have unacceptable interference at the subscriber terminal.

SUMMARY OF THE INVENTION

It is an object of the present invention to provide a method for maintaining a stable radio connection by minimizing interference caused by the traffic channel used in the radio communication system.

In order to achieve the above object, the present invention provides a call processing method for exchanging channel information between a radio terminal and a base station by using a traffic channel. The method comprises the steps of: selecting a traffic channel having interference below a given level by the radio terminal, the selection being made in response to an outgoing call request by using the radio terminal by a radio subscriber; making a proposed list of available traffic channels: selecting a traffic channel having the least interference from the proposed list; requesting the call to the base station; investigating all of the available traffic channels by the base station; making a proposed list of traffic channels having interference below a given level; storing the list; determining whether or not a traffic channel selected at the terminal is a channel included in the proposed list of the base station. The method further includes the steps of returning to a RSSI (received signal strength indicator) scan mode when a call request was not received from the radio terminal by the base station; and continuously investigating the RSSI of available traffic channels. A call request response is forwarded to the radio terminal when there is a corresponding traffic channel in the proposed traffic channel list of the base station. The radio terminal then checks whether or not a call request response message at the traffic channel selected by the radio terminal is received from the base station. The call processing is continued which fixes a traffic channel and transmits hand shake information to the base station when the call request response message was received from the base station.

When the traffic channel presented by the radio terminal is not found in the base station's proposed list, the interference level of traffic channels in the base station's proposed list is compared with the interference level of traffic channels sent from the terminal's proposed list and a different traffic channel having the least interference is selected. The selected traffic channel being included in two lists of the base station and radio terminal.

Once another traffic channel is selected, the base station forwards a traffic channel changing request message to the radio terminal, requesting a change of the channel to the traffic channel re-selected by the base station. A determination is made by the radio terminal whether or not a changing request message to the selected channel is received from the base station. When the changing request message to the selected channel is made and received by the radio terminal from the base station, the call request is forwarded again to the base station after the radio terminal changes the channel into the base station's selected traffic channel. The base station then determines whether or not the radio terminal's subsequent call request message is received at the changed traffic channel after the base station has changed the channel into the traffic channel it selected previously.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF PREFERRED EMBODIMENT(S)

Hereinafter, a preferred embodiment of the present invention will be concretely explained with reference with accompanying drawings.

Figure 1:
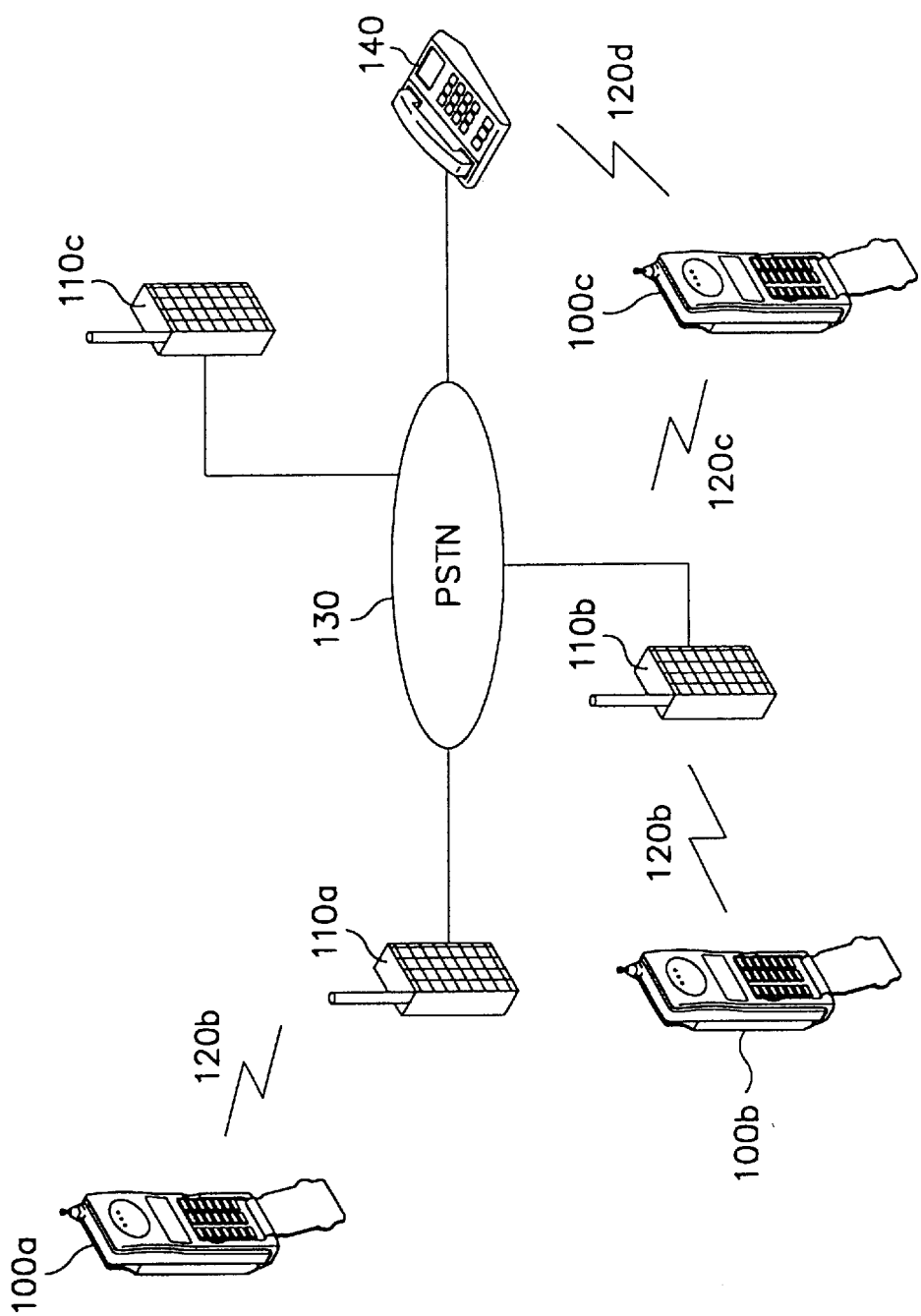
FIG. 1 shows a plain view of a radio communication network referred to in an embodiment of the present invention.
Figure 2:
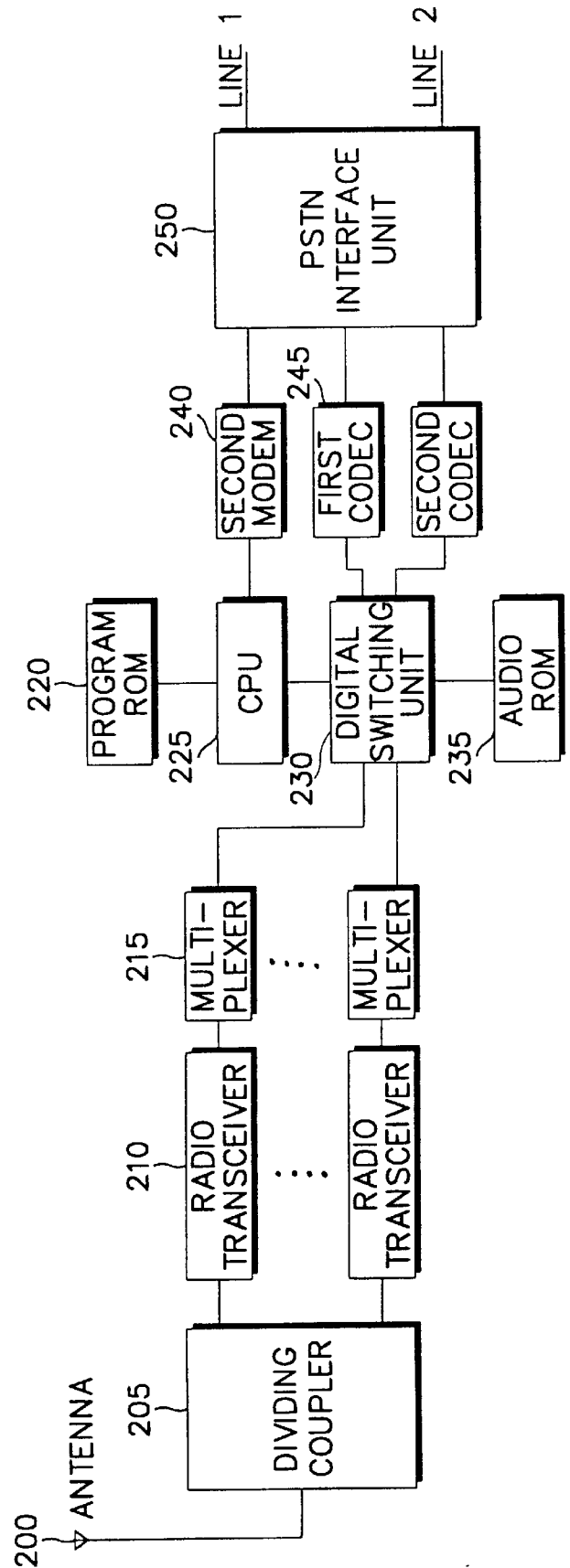
FIG. 2 is a block diagram of a base station of the radio communication system illustrated in FIG. 1.
Figure 3A:
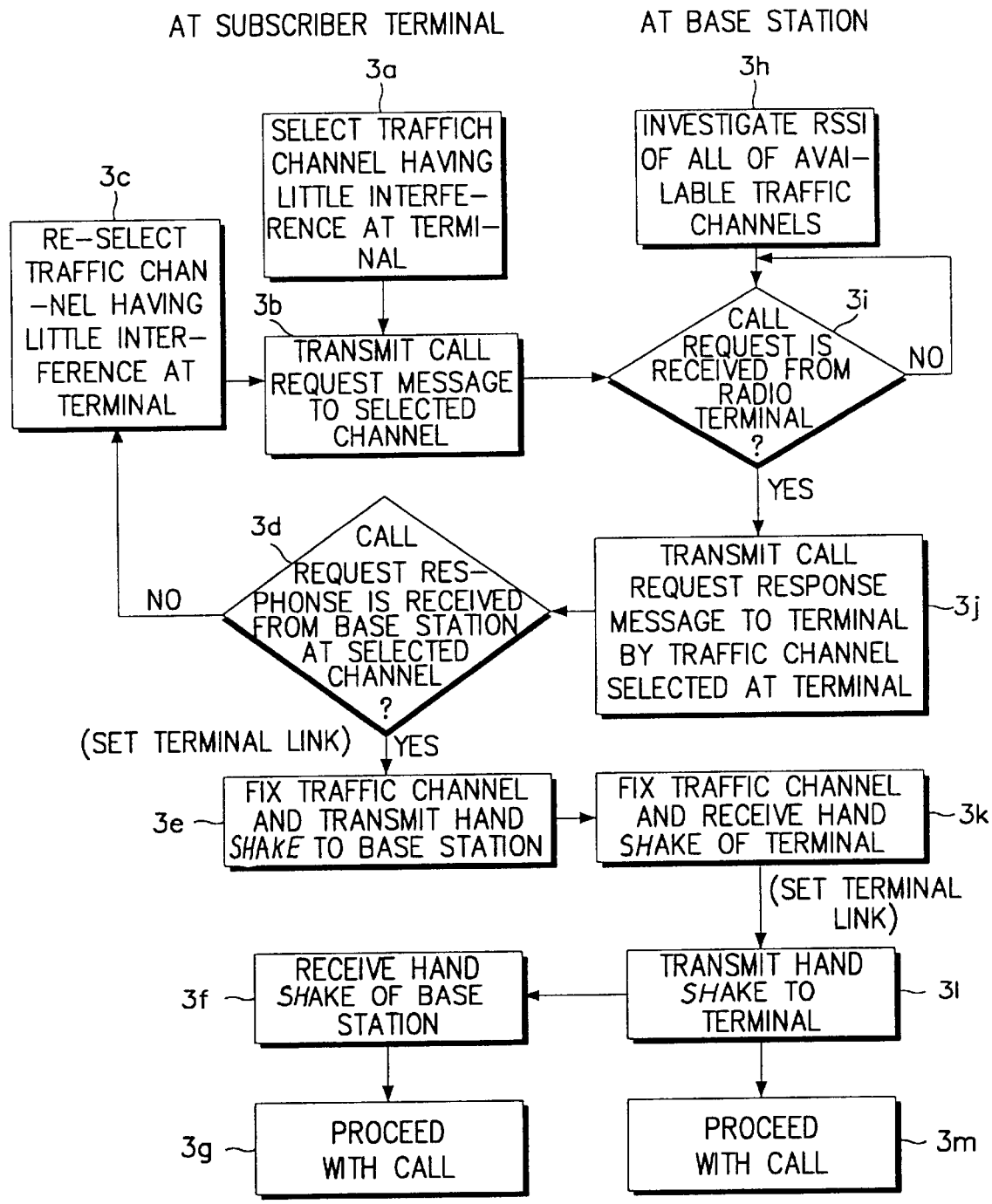
FIG. 3A is a flow chart showing the call set-up method between a conventional radio terminal and a radio communication system by using only traffic channels.
Figure 3B:
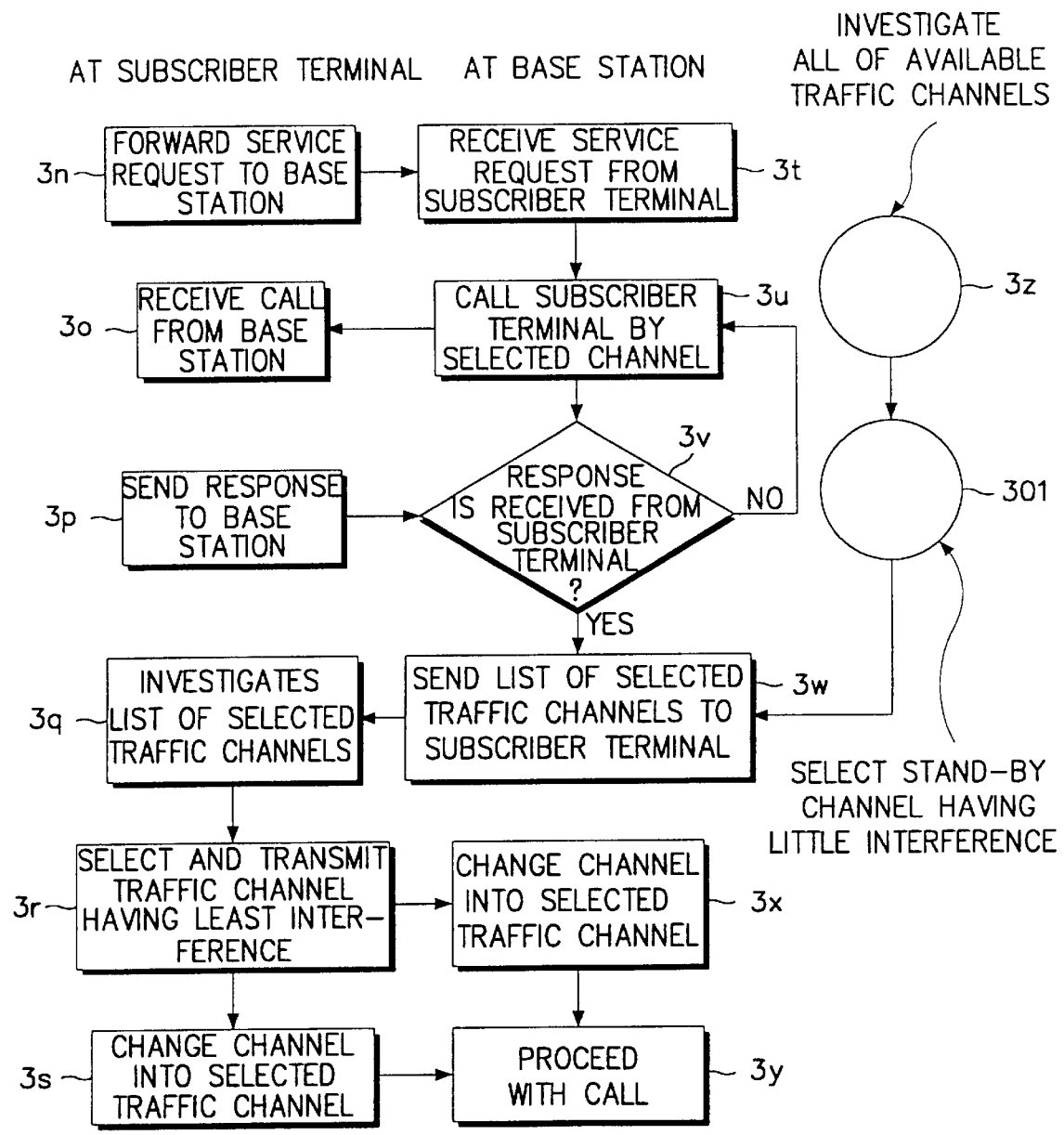
FIGS. 3B is a flow chart showing a prior art call set-up methods between a radio terminal and a radio communication system by using more than one radio signal channels different from traffic channels as described in U.S. Pat. No. 5,276,908.

FIG. 1 shows the construction of a radio communication network referred to in an embodiment of the present invention. FIG. 2 is a block diagram of a base station of the radio communication system as illustrated in FIG. 1, and FIGS. 4A and 4B, and FIGS. 4C and 4D are flow charts showing different embodiments of the method for call processing between a terminal and a base station according to the present invention.

Figure 4A:
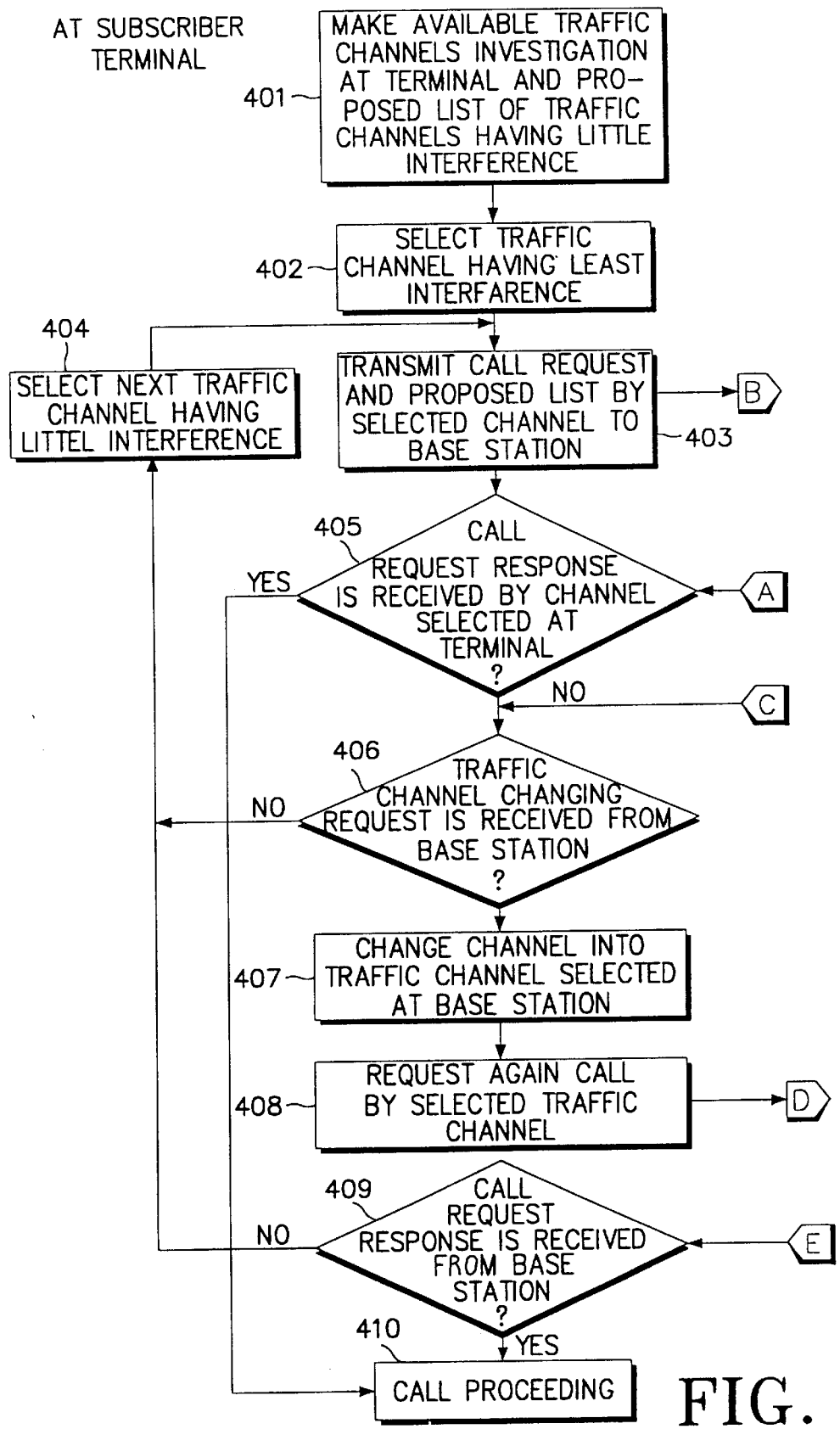
FIGS. 4A and 4B is a flow chart showing the method for call processing between a terminal and a base station according to an embodiment of the present invention.
Figure 4B:
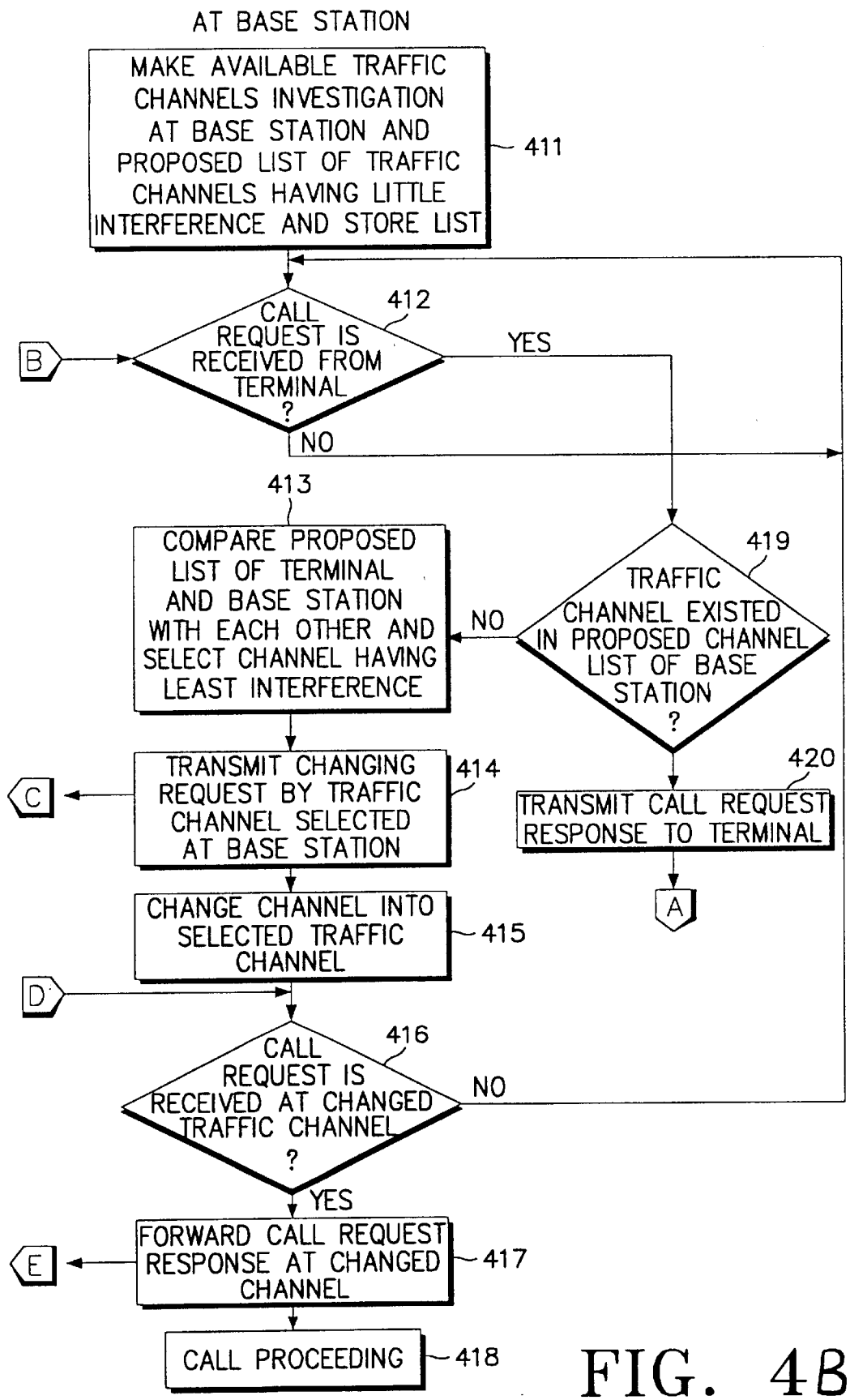

FIGS. 4A and 4B show the traffic channel process upon requesting the outgoing signal. First, the system conducts an available traffic channels investigation at the subscriber terminal and makes a proposed list of traffic channels having little interference (401). The traffic channel having the least interference is then selected (402), and the call request and proposed list are transmitted to the base station by using the selected channel (403). At this point, the base station investigates all available traffic channels and generates and stores a proposed list of the traffic channels having little interference. A determination is then made whether or not the call request exists from the subscriber terminal (412). When the call request exists, the base station then determines whether or not the traffic channel selected by the subscriber terminal exists in the proposed channel list generated the base station (419). If the traffic channel is in the proposed channel list of the base station, a call request response signal is transmitted to the subscriber terminal (420). If the call request response is received (405), the call proceeds (410) on the channel originally selected at the terminal.

When the traffic channel selected at the terminal does not exist in the proposed list in the base station (419), the proposed lists of the terminal and the base station are compared with each other, and the channel having least interference is selected (413). Once another channel is selected, a changing request signal is transmitted to the subscriber terminal over the traffic channel selected at the base station (414). The subscriber terminal then checks whether or not a traffic channel changing request is received from the base station (406) when there is no call request response received in step 405, or upon receipt of a transmitted changing request signal by the traffic channel selected at the base station in step (414). When the traffic channel request signal was not received in step (406), the next traffic signal having little interference is selected by the subscriber terminal (404). When the traffic channel request signal was received in step (406), the subscriber terminal changes the channel into the traffic channel selected at the base station (407) and the call is requested again by using the selected traffic channel (408). After requesting the call again by the selected traffic channel (step 408), the base station determines whether or not the call request is received at the changed traffic channel (416). Prior to receiving this call request, the base station changes its channels to the newly selected channel at step (415). When the call request is received on the changed channel (step 416), a call request response signal is transmitted to the terminal at the changed channel (417) and the call proceeding (410 and 418) takes place. When the base station's call request response is not received by the subscriber terminal (at step 409), the terminal selects the next traffic channel of least interference (404).

Figure 4C:
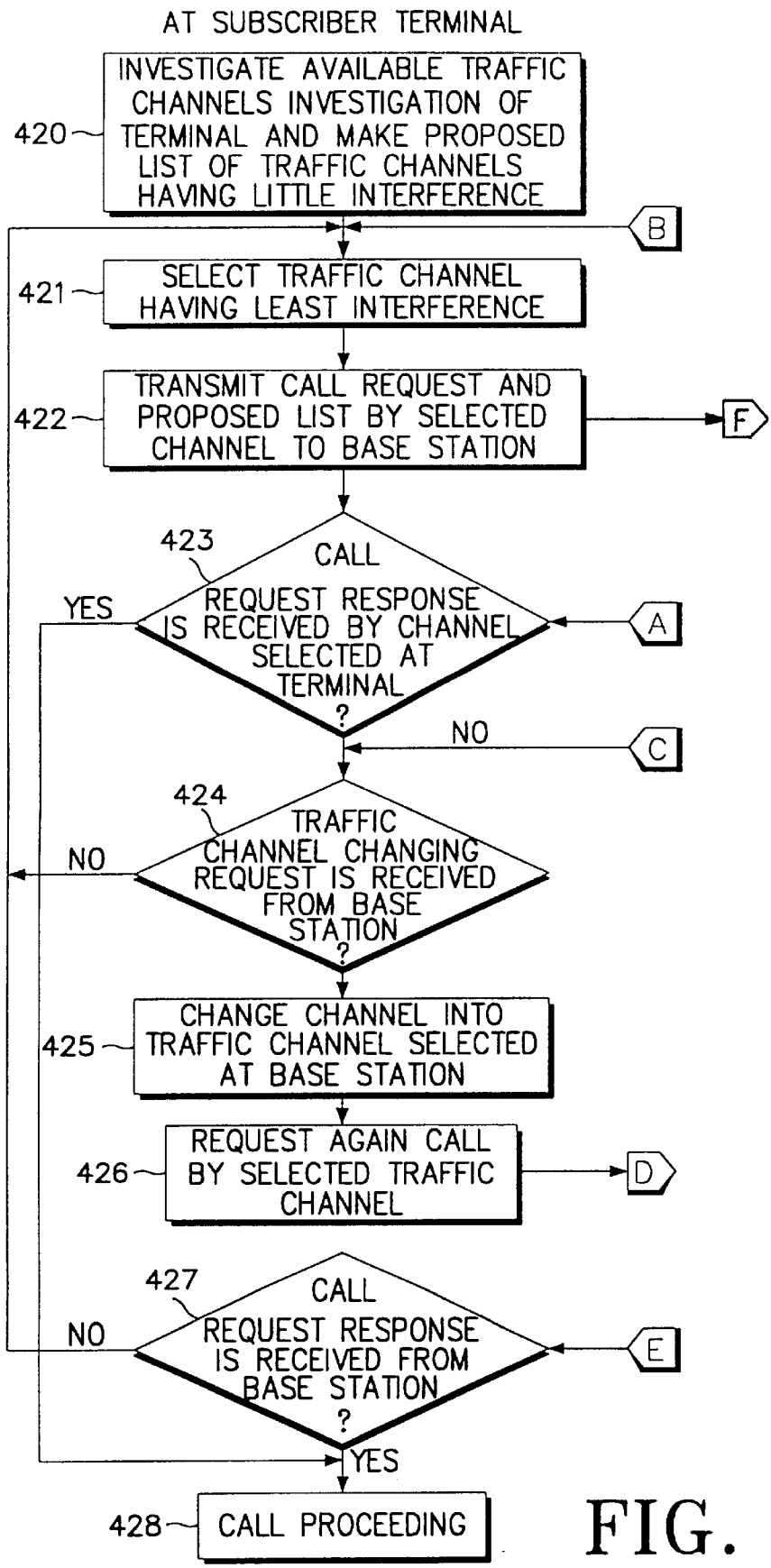
FIGS. 4C and 4D is a flow chart showing the method for call processing between a terminal and a base station according to another embodiment of the present invention.
Figure 4D:
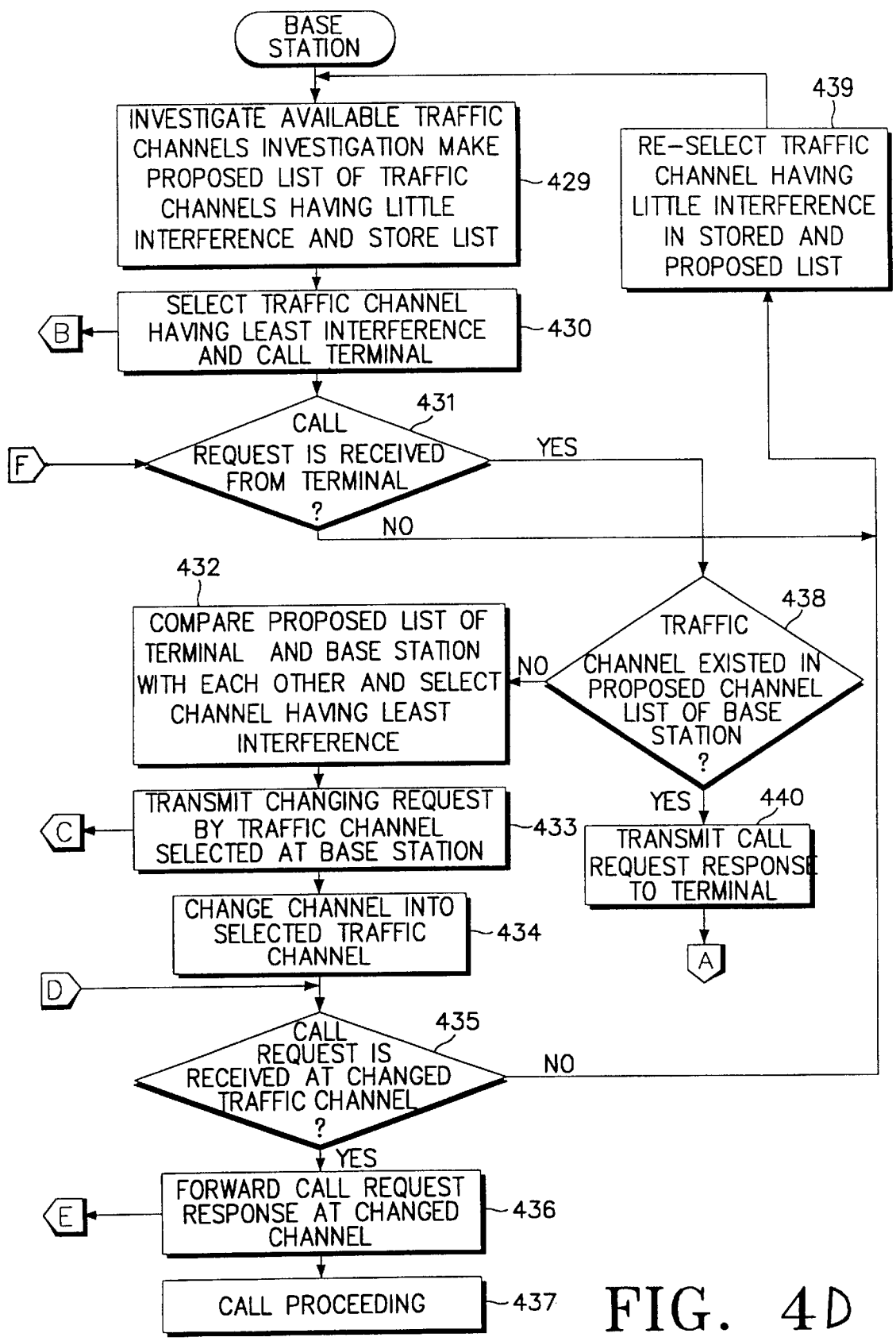

Further, FIGS. 4C and 4D show the traffic channel process upon requesting an incoming signal. The process begins by conducting an available traffic channels investigation of the subscriber terminal and generating a proposed list of channels having little interference (420). The base station also conducts an available traffic channels investigation and generates and stores a proposed list of traffic channels having little interference (429). The base station then selects the channels having the least interference and calls the terminal on the selected channel (430). The terminal selects the traffic channel with the least interference (421) and then transmits a call request and the terminal's proposed list to the base station via the selected channel (422). The base station then checks whether or not the call request is received from the terminal (431). When the call request is not received at step (431), the base station re-selects the traffic channel having little interference from the stored and proposed list (439). When the call request is received at step (431), the base station checks whether or not the traffic channel exists in its proposed list of channels (438). If the channel exists in the proposed list, a call request response signal is transmitted to the terminal (440). The terminal then checks whether or not the call request response signal is received by the channel selected at the terminal (423). If the call request response signal is received, the call proceeds (428).

If the traffic channel does not exist in the base station's proposed list at step (438), the base station compares its proposed list with the terminal's proposed list and selects the channel having the least interference (432). The base station then transmits a changing request (433) by the traffic channel it selected in step (432), and changes the channel into the selected channel (434). When the terminal does not receive the call request response at step (423), it checks whether or not the traffic channel changing request signal is received from the base station (424). When the traffic channel changing request signal is received, the terminal then changes the channel into the traffic channel selected at the base station (425) and again requests the call by the selected traffic channel (426). The base station checks whether or not the subsequent call request from the terminal at step (426) is received at the changed traffic channel (435). If the call request response signal at the changed channel is received at the base station at step (435), the call request is forwarded to the terminal at the changed traffic channel (436) and the call proceeds (437). When the call request response signal is received from the base station (427) the call proceeds at the subscriber terminal (428).

In the illustration of FIG. 1, a typical network can consist of small base stations 110a, 110b, and 110c, connected to the public switched telephone network (PSTN) 130 and the call is formed with the subscriber radio terminals 100a, 100b and 100c from the base stations 110a, 110b, and 110c. At least, one of the base stations 110a, 110b, and 110c has the radio transceivers 210 as shown in FIG. 2. These can be deployed in offices, residences, and public areas, such as airports, gas stations and shopping mails, etc. The base stations 110a, 110b, and 110c, form the interface between a number of subscriber terminals 100 and the PSTN 130. For example, a radio terminal 100c requests the call and a radio link 120c can be formed with the base station 110b. Although there may be interference at the base station, the radio link 120c is affected due to the interference of the radio link 120d at the subscriber end. This interference results in a deterioration of the overall quality of the radio link 120c.

In an embodiment of the present invention, FIGS. 4A and 4B and FIGS. 4C and 4D are flow charts showing call processing between a terminal and a base station where FIGS. 4A and 4B show the traffic channel processes upon requesting the outgoing signal and FIGS. 4C and 4D show the traffic channel processes upon requesting the incoming signal. In both embodiments depeicted in FIGS. 4A and 4B, and FIGS. 4C and 4D, the channel information is exchanged between the radio terminal and the base station by using only a selected traffic channel. Also, the radio terminal 100a and the base station 110a investigates all of the available traffic channels and store the information in their respective memory.

With respect to FIG. 1, upon requesting the outgoing call by using the radio terminal 100a of the radio subscriber, the traffic channel determination between the radio terminal 100a and the base station 110a proceeds as shown and previously described in FIGS. 4A and 4B. The radio terminal 100a selects the traffic channel having the least interference (step 402), after making a proposed list of traffic channels having interference below a predetermined threshold (step 401). Radio terminal 100a then transmits the call request and its proposed list to the base station 110a (step 403). The base station 110a investigates all of the available traffic channels and generates and stores the proposed list of traffic channels having interference below the given level (step 411). The base station then waits to determine whether or not the call is requested from the radio terminal (step 412). This state can be called as a RSSI scan mode. In the event that the call request was not received from the radio terminal 100a, the base station 110a returns to the RSSI scan mode and continuously investigates the RSSI of the available traffic channels. When the call request is received from the radio terminal 100a, the base station 110a checks whether or not the traffic channel selected at the terminal is a traffic channel included at the proposed list generated by the base station (step 419). When the traffic channel exists in the proposed list of the base station, the base station 110a sends a call request response (step 420) to the radio terminal 100a. The radio terminal 100a checks whether or not the call request response message at the traffic channel selected by the radio terminal 100a is transmitted from the base station 110a (step 405) and, when the call request response message was received, proceeds with the call (step 410) of fixing the traffic channel and transmitting hand shake information to the base station 110a.

However, if the terminal transmit channel is not found in the base station's proposed list (step 419), the base station 110a compares the proposed list of the traffic channels from the terminal with the proposed list of the base station 110a and selects the traffic channel having the least interference (step 413). The selected traffic channel being included in two lists. The base station 110a then forwards a traffic channel changing request message to the radio terminal 100a (step 414). When the call request response signal was not received at step 405, the radio terminal 100a checks whether or not the traffic channel changing request message is received from the base station (step 406). After changing the traffic channel into the one selected at the base station (step 402), the radio terminal 100a again forwards the call request to the base station 110a (step 408). The base station 110a changes the channel to the traffic channel it selected previously (step 415), and then checks whether or not the subsequent call request message of the radio terminal 100a at the changed traffic channel is received (step 416). When the call request message is not received at step 416, the base station returns to the RSSI scan mode as the initial mode. If the call request message is received at step 416, the base station 110a forwards a call request response to the terminal (step 412) and proceeds with the call (step 418), by transmitting the hand shake information to the radio terminal 100a. If the call request response message was not received by the terminal at step 409, the radio terminal 100a selects the next traffic channel having least interference among the traffic channels included in the proposed list thereof and again sends the call request message (step 403) to the base station 110a.

In FIG. 1, when there is the incoming call of requesting the call to the PSTN 130 and the base station 110b by a wire subscriber 140, the traffic channel determination between the radio terminal 100b and the base station 110b proceeds as shown in FIG. 4B. The base station 110b investigates all of the available traffic channels at the RSSI scan mode, makes a proposed list, and stores the proposed list in memory (step 429). It then selects the traffic channel having the least interference at the pre-made, stored and proposed list of the traffic channels and calls the radio terminal 100b (step 430). The radio terminal 100b receives the call from the base station 110b and then selects the traffic channel having the least interference from its own proposed list (step 421) generated at step 420. The radio terminal then transmits to the base station the call request and its proposed list of the traffic channels having the little interference on the traffic channel it selected previously (step 422). When the call request of the radio terminal 100b at the traffic channel selected by the radio terminal 100b is received (step 431), the base station 110b checks whether or not the currently-linking traffic channel is included in the proposed channel list of the base station (step 438). When the call request from the radio terminal 100b is included in the traffic channel in the proposed list at step 438, the base station 110b transmits the call request response message for requesting the call to the radio terminal 100b (step 440). The radio terminal 100b checks whether or not the call request response message exists at the terminal (step 423), and continues to call processing (step 428) when the call request message has been detected. When the call request of the radio terminal 100a was not received at step 431, the base station 110b re-selects the next traffic channel having little interference from the proposed list of the base station (step 439) and calls the radio terminal 100b.

When the call request is received at step 431, and no corresponding traffic channel is included in the proposed list of the base station (step 438), the base station compares the proposed list sent from the terminal with the proposed list of the base station, and selects the traffic channel having the least interference and being included in two lists (step 432), and forwards the re-selected traffic channel changing request message to the radio terminal 100b (step 433).

If a traffic channel changing request is sent by the base station to the radio terminal (step 433), then the call request response message is not found at step 423. The radio terminal checks whether or not the re-selected traffic channel changing request message has been received from the base station (step 424). When the changing request message is not found, the radio terminal 100b returns to the call reception stand-by mode from the initial base station. However, when the changing request message is detected at step 424, the radio terminal 100b changes the traffic channel into the re-selected channel (step 425) and again sends the call request message to the base station 110b (step 426). After changing the channel into the selected traffic channel (step 434), the base station 110b checks whether or not the call request exists from the radio terminal 100b (step 435). If the call request at the changed channel is detected by the base station 110b at step 435, it transmits a call request response message to the radio terminal 100b (step 436). If the call request is not detected at step 435, the base station re-selects the traffic channel (step 439) begins the process over in an attempt to proceed with the call. When the radio terminal 100b receives the call request response message at the changed traffic channel at step 427, it proceeds with the call (step 428). When the call request response message was not received by the terminal at step 427, it returns to the call signal stand-by mode from the base station.

FIG. 2 shows the construction of base stations 110a, 110b, and 110c of a radio communication system referred in the embodiment of the present invention as illustrated in FIG. 1. An antenna 200 is connected to the dividing coupler 205 as a port for transmitting/receiving a modulated RF signal. The dividing coupler 205 couples the modulated RF output signal of a maximum of six radio transceivers 210, transmits the coupled signal to the radio terminals 100a, 100b, and 100c, receives the RF modulation signal transmitted from the subscriber radio terminal from the antenna 200, divides the received signal into six signals, and supplies the divided signals to the maximum, six radio transceivers 210. The radio transceiver 210 sends the supplied signals to multiplexers 215. The multiplexers 215 perform layer 1 function at the common air interface protocol for radio-communicating the base stations 110a, 110b, and 110c with the subscriber radio terminals 110a, 110b, and 110c in the radio communication system as shown in FIG. 1.

The wire subscriber 140 of FIG. 1 is connected with PSTN interface unit 250 while passing through the PSTN 130. An audio signal passing through the PSTN interface unit 250 is encoded as the PCM signal at a codec 245 and is switched to the corresponding multiplexer 215 through digital switching unit 230. The units as stated before are controlled by the CPU 225, and the program of operating the base station is included within a program ROM 220. The CPU 225 sequentially enables the radio transceivers 210 within the base station in operating the program contained in the program ROM 220.

The radio transceivers investigate the RSSI of all of the available traffic channels located at the current position of the base station, list and store the traffic channels having the little interference in an SRAM included at the base station, and when the call request is received from the radio terminal, selects the traffic channel with the above processes and proceeds with the call. The base stations 110a, 110b and 110c of FIG. 1 stores the radio subscriber information and communication information in the memory when communicating with the radio subscriber. The subscriber information is passed through a modem 240, when requested by an upper unit of the base station, and forwarded to the upper unit thereof by passing it to the PSTN interface unit 250. The modem 240 converts the analog signal into the digital signal of the base station, transmits the converted signal to the upper unit of the base station through the PSTN interface unit 250, and converts the analog signal transmitted from the upper unit of the base station into the digital signal. The converted signal is supplied to the base station upon data communication between the base station and the upper unit of the base station.

As apparent from the foregoing, upon forwarding the radio terminals proposed list of traffic channels having interference below a predetermined threshold, and the call request to the base station via the traffic channel selected from the proposed list having the least interference at the subscriber radio terminal for determining the traffic channel, the present invention can compare the forwarded list with the base station's proposed list and set the radio terminal and the radio link, so that when a call set-up is initiated, the traffic channel having least interference at the base station and the radio terminal is selected, and the call proceeds with a very stable radio link.

Therefore, it should be understood that the present invention is not limited to the particular embodiment disclosed herein as the best mode contemplated for carrying out the present invention, but rather that the present invention is not limited to the specific embodiments described in this specification, except as defined in the appended claims.

What is claimed is:

1. A call processing method for exchanging channel information between a radio terminal and a base station by using a traffic channel, the method comprising the steps of:

the radio terminal internally generating a list of radio terminal traffic channels having interference below a predetermined level at the radio terminal;

selecting a first traffic channel from the generated list having least interference;

transmitting a call request to the base station on the first selected traffic channel;

the base station generating a list of base station traffic channels having interference below a predetermined level at the base station;

determining whether the transmitted call request has been received by the base station;

checking whether the first selected traffic channel is included in the list generated by the base station;

transmitting a call request response signal to the radio terminal when said first selected traffic channel is included in the list generated by the base station;

checking whether the call request response message is received by the radio terminal on the first selected traffic channel; and proceeding with the call connection when the call request response message is received by the radio terminal.

2. The method according to claim 1, wherein upon requesting an outgoing call, the method further comprises the steps of:

transmitting the generated list of radio terminal traffic channels to the base station with the transmitted call request;

comparing the generated lists of the base station and radio terminal when said first selected traffic channel is not included in the list generated by the base station;

selecting a second traffic channel having the least interference and being included in both the radio terminal's and base station's generated lists;

transmitting a channel changing request from the base station to the radio terminal;

determining whether the channel changing request to the second selected traffic channel is received by the radio terminal;

transmitting the call request to the base station on the second selected traffic channel;

determining whether the call request on the second selected traffic channel is received by the base station;

transmitting a call request response signal to the radio terminal when the call request on the second selected traffic channel is received by the base station; and proceeding with the call connection when the call request response signal is received by the radio terminal.

3. The method according to claim 1, wherein said step of generating a list of radio terminal traffic channels further comprises the steps of:

searching all available traffic channels at the radio terminal; and determining which available channels have interference below the predetermined level.

4. The method according to claim 1, further comprising the steps of:

returning to a RSSI (received signal strength indicator) scan mode when the transmitted call request from the radio terminal is not received by the base station; and continuously searching the RSSI of available traffic channels.

5. The method according to claim 2, further comprising the step of:

selecting the next traffic channel having the least interference when the radio terminal does not receive the transmitted traffic channel changing request from the base station.

6. The method according to claim 2, further comprising the step of:

selecting the next traffic channel having the least interference when the transmitted call request response signal on the second selected traffic channel is not received by the radio terminal.

7. The method according to claim 1, wherein upon receiving an incoming call, the method further comprises the steps of:

selecting a traffic channel having the least interference from the traffic channel list generated by the base station;

calling the terminal on the base station selected traffic channel;

transmitting the radio terminal traffic channel list to the base station with the transmitted call request;

comparing the generated lists of the base station and radio terminal when said first selected traffic channel is not included in the list generated by the base station;

selecting a second traffic channel having the least interference and being included in both the radio terminal's and base station's generated lists;

transmitting a channel changing request from the base station to the radio terminal;

determining whether the channel changing request is received by the radio terminal;

transmitting the call request from the radio terminal to the base station on the second selected traffic channel when the channel changing request is received;

determining whether the transmitted call request is received by the base station;

transmitting a call request response signal to the radio terminal when the call request on the second selected traffic channel is received by the base station; and proceeding with the call connection when the call request response signal is received by the radio terminal.

8. The method according to claim 7, further comprising the step of re-selecting a traffic channel having little interference from the base station's generated list when the call request on the second selected channel is not received from the radio terminal.

9. The method according to claim 7, further comprising the step of re-selecting a traffic channel having little interference from the base station's generated list when the base station does not receive the transmitted call request on the first selected traffic channel from the radio terminal.

* * * * *